E. A. BUSACKER.
TRUCK DUMPING DEVICE.
APPLICATION FILED JAN. 23, 1920.
1,403,587.
Patented Jan. 17, 1922.
2 SHEETS—SHEET 1.
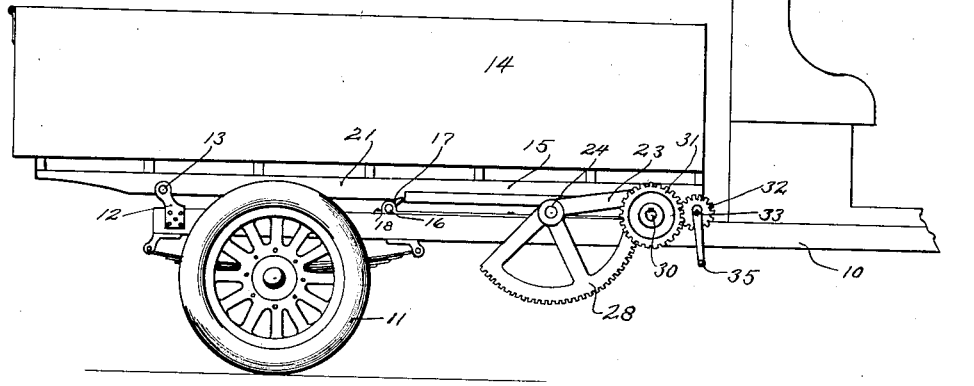
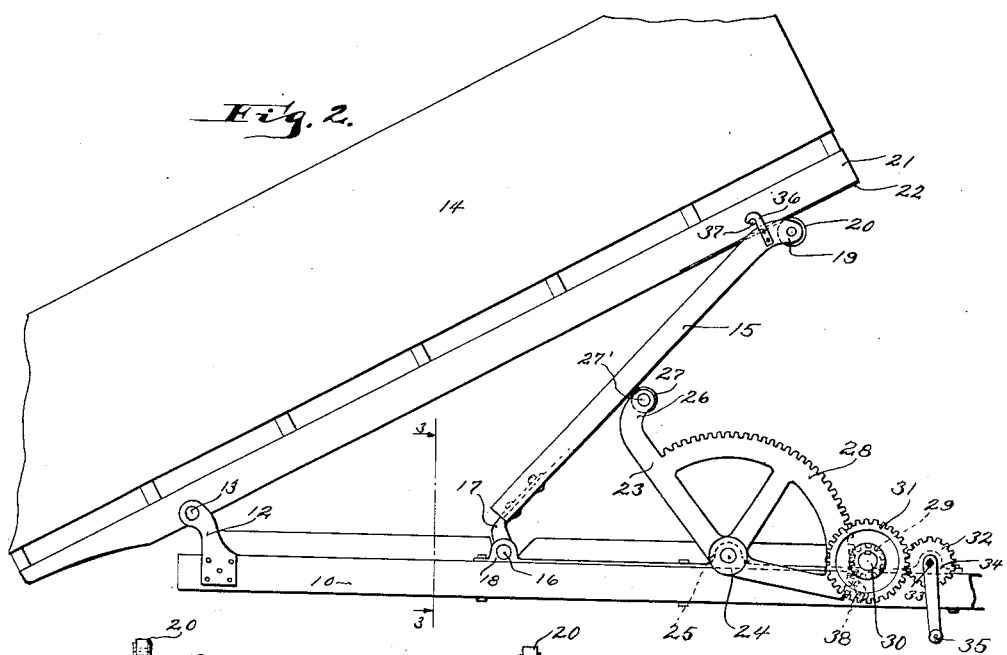
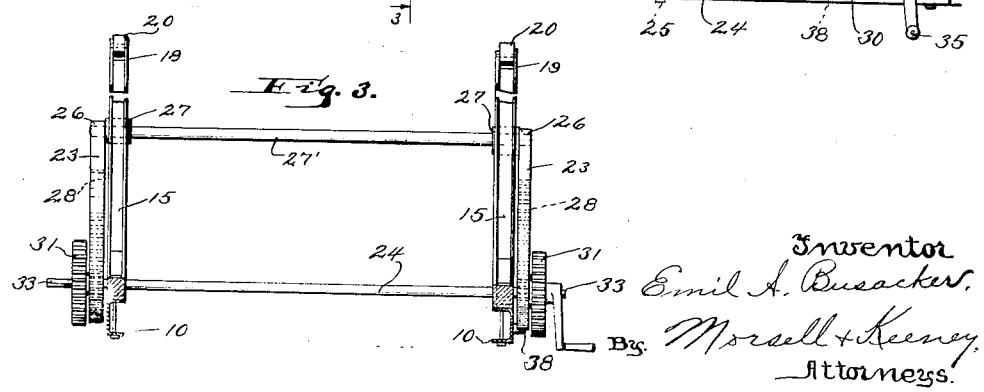
Inventor
Emil A. Busacker.
By Morsell & Keeney
Attorneys.

E. A. BUSACKER.
TRUCK DUMPING DEVICE.
APPLICATION FILED JAN. 23, 1920.
1,403,587.
Patented Jan. 17, 1922.
2 SHEETS—SHEET 2.
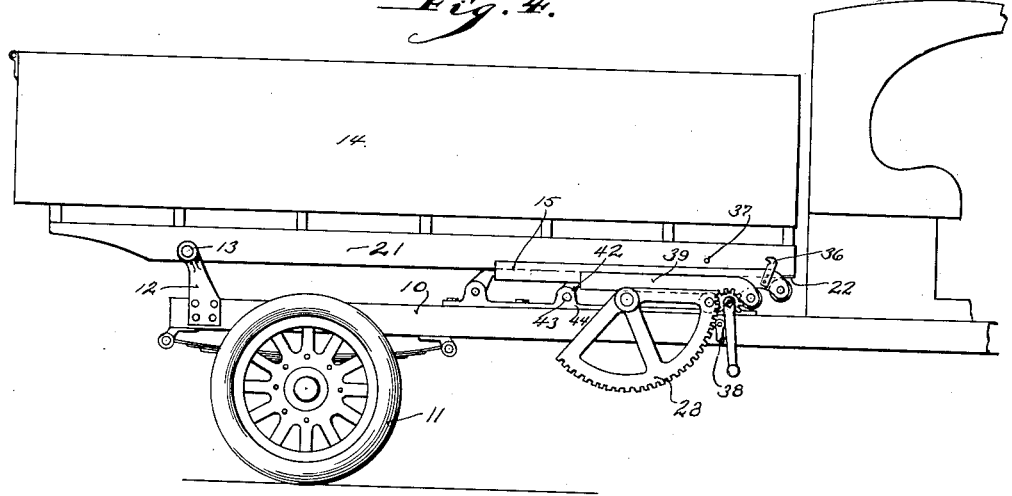
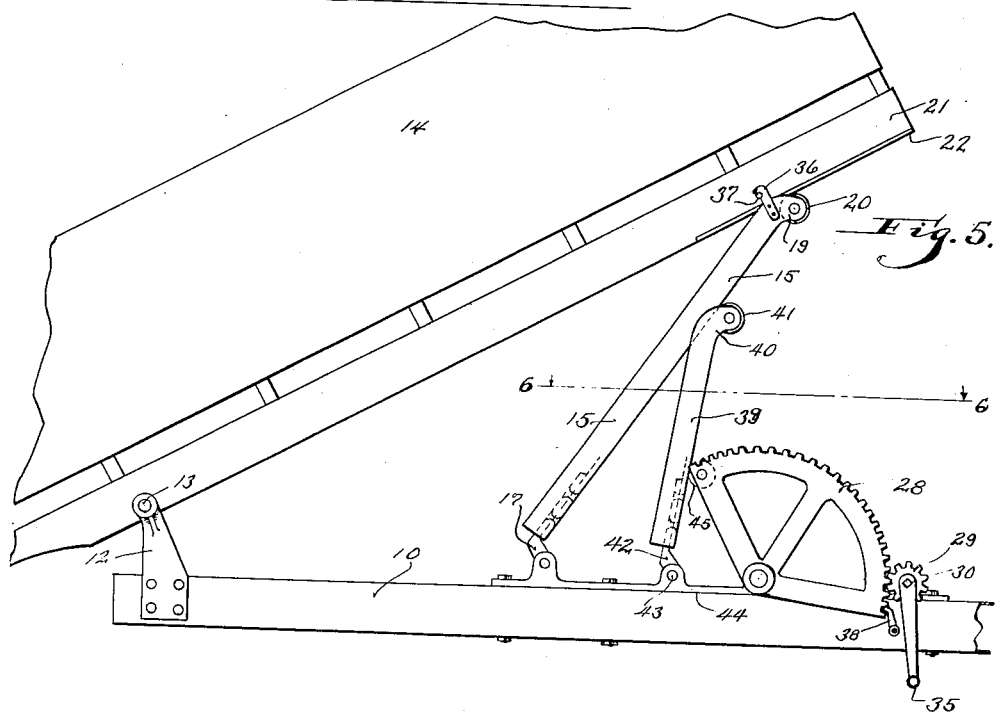
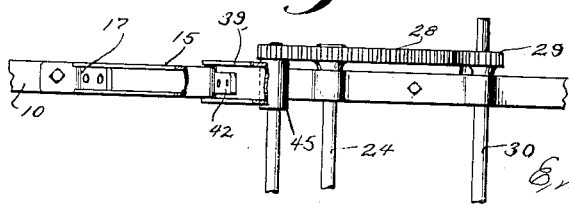
Inventor
Emil A. Busacker,
By Morsell & Keen
Attorneys

UNITED STATES PATENT OFFICE.

EMIL A. BUSACKER, OF MILWAUKEE, WISCONSIN.

TRUCK-DUMPING DEVICE.

1,403,587.  Specification of Letters Patent.  Patented Jan. 17, 1922.

Application filed January 23, 1920. Serial No. 353,551.

*To all whom it may concern:*

Be it known that I, EMIL A. BUSACKER, 788 19th Street, Milwaukee, a citizen of the United States, and resident of Milwaukee, in the county of Milwaukee and State of Wisconsin, have invented new and useful Improvements in Truck-Dumping Devices, of which the following is a description, reference being had to the accompanying drawings, which are a part of this specification.

The present invention relates to vehicle trucks and more especially to that type of truck in which the load receiving box is elevated at its forward end to discharge the load and may be used for handling various kinds of bulk material.

One object of this invention is to provide simple and efficient means carried by the vehicle chassis frame and engageable with a load receiving box for moving the same on its pivot.

A more specific object of this invention is to provide levers pivotally mounted on the vehicle chassis frame and co-operating to provide means for tilting the load receiving box, said levers being so arranged as to permit the tilting of the box with ease and facility.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawings I have illustrated two complete examples of the physical embodiment of my invention constructed according to the best modes I have so far devised for the practical application of the principles thereof, and in which:

Figure 1 is a side view of a portion of a vehicle truck equipped with my improved device.

Figure 2 is an enlarged view of a portion of the vehicle chassis frame and the load receiving box illustrating the box as being in tilted or dumping position.

Figure 3 is a view part in section and part in elevation taken on the plane indicated by the line 3—3 of Figure 2.

Figure 4 is a view similar to Figure 1 of a slightly modified tilting device.

Figure 5 is a view similar to Figure 2 of that form of my invention depicted in Figure 4; and Figure 6 is a view part in section and part in elevation taken through Figure 5 on the line 6—6.

In general, the invention consists of sets of levers pivotally mounted on each side bar of the vehicle chassis frame and arranged to nest one within the other when in folded or inoperative position and co-acting to provide a strong leverage for tilting the box, one of the levers being operated manually or otherwise by a driven shaft through a gear reduction.

My device may be used on any type of vehicle truck including a chassis frame 10 supported by the usual rear drive wheels 11 and front wheels (not shown) and having a bracket member 12 secured to each side bar of the chassis frame adjacent the extreme rear end thereof, which brackets are pivotally connected as at 13 with a load receiving box 14. As is usual in such constructions the pivot 13 is disposed near the rear end of the load receiving box and the forward end of the box is free and adapted to be engaged by suitable lifting means to raise or lower the same to discharge the contents of the box.

In that form of my invention depicted in Figures 1 to 3 I provide two sets of complementary levers, one set carried by each side bar of the chassis frame, and as the sets are substantially identical the description of one will suffice for both.

A main lifting lever 15 formed of channel iron has its outer end pivoted as at 16 by means of a bracket member 17 secured to the outer end of said lever and engaging a bearing member 18 secured to the chassis frame side bar. The inner end of said lever is curved downwardly a short distance as at 19 and has journalled therein a roller 20 adapted to track along the under side of the box 14. The box 14, as is usual, has a rail or side bar 21 carried thereby and disposed along each side thereof, and it is along the under side of this rail that the roller 20 tracks, a metal plate 22 being secured to the bar 21 to reduce the wear by the roller 20 to a minimum.

The main lifting lever 15 has its inner end raised or lowered to impart a corresponding movement to the inner free end of the load receiving box by a secondary lever 23 having its outer shaft 24 journalled in bearings 25 secured to the chassis frame side bars and its forward end slightly curved downwardly as at 26 and having journally secured thereto a roller 27 adapted to track on the under side of the main lifting lever. As best shown in Figure 2 the secondary lever 23 is integral with a segmental gear 28 meshed with a small pinion gear 29 splined to a shaft 30 extending across the chassis frame and journalled in bearings secured to the chassis frame side bars.

As best shown in Figure 3 the forward ends of the levers 23 of both sets are connected by means of a rod 27' and the shaft 24 and shaft 30 also extend across the chassis frame, the shaft 30 being the main drive shaft and having the gear 29 in mesh with the teeth of both segmental gears 28. The shaft 30 also has splined to each end thereof outwardly of the pinions 29 a relatively large gear 31 in mesh with a pinion gear 32 slightly larger than the pinions 29. The gears 32 are mounted upon a shaft 33 extending across the chassis frame and journalled in bearings 34 secured to each chassis frame side bar.

The shaft 33 is adapted to be rotated by any desired means to impart the desired movement to the secondary lever 23 and consequently the main lifting lever 15 and the tilting box 14 through the medium of the gear reduction hereinbefore described and in the present instance I have illustrated the same as operable manually by means of a hand crank 35 adapted to be engaged with either end of the shaft 33. In order to prevent the gears 29 from running off the gears 28 and also to limit the upward movement of the forward end of the box 14 I provide stop means including a hook member 36 carried by each lever 15 near its forward end and adapted to engage pins or stops 37 secured to the side bars 21 when the box has been tilted the desired angle.

The box 14 may be held in tilted position by means of a pawl or detent 38 pivotally carried by the chassis frame side bar and adapted to engage the teeth of the segmental gear 28. This pawl may be of any well known construction and when it is desired to lower the box to normal position the same is disengaged from the segmental gear and the box allowed to return under its own weight, the speed of the return being controlled by the operator.

Referring now more particularly to Figures 4 to 6, the secondary lever 39 is independent from the segmental gear 28 and is somewhat similar in construction to the main lifting lever 15 with the exception that its length is considerably shorter. The lever 39 has its forward end curved as at 40 and provided with a roller 41 adapted to track along the under side of the main lifting lever, the rearward end of the lever 39 being pivotally mounted by means of a bracket 42 journalled as at 43 to a bearing member 44 carried by the chassis frame side bar.

The segmental gear 28 in this form of my invention has a roller member 45 mounted at its upper forward corner adapted to track along the under side of the secondary lever 39 and as the leverage is increased in this form of my invention the gears 31 and 32 are dispensed with and the shaft 30 rotated by means of the hand crank 35.

By the use of channel iron in forming the levers 15 and 39 the same are nested as depicted in Figure 4 when the box 14 is in its normal position whereby the levers are not cumbersome and occupy but a small amount of space when not in operative use and also provide strong leverage for tilting the box on its pivots.

What I claim as my invention is:

1. In a vehicle, the combination with a frame and a tiltable load receiving box pivoted at one end thereto, of a main lifting lever having one end pivotally secured to the frame and its other end engageable with the under side of the box adjacent its forward free end, a segmental gear journally carried by said frame, a second lever carried by said segmental gear having means on its free end for engaging the under side of said main lifting lever, and means for rotating said segmental gear on its pivot to raise and lower said box.

2. In a vehicle, the combination with a frame having a tiltable load receiving box pivoted at one end thereto, of a lever having one end pivotally secured to the frame and its other end free, roller means journalled in the free end of said lever and adapted to track along the under side of said box adjacent its forward free end, a segmental gear journally carried by said frame, a second lever carried by said segmental gear, a roller journalled in the forward end of said second lever and adapted to track along the under side of the main lifting lever, means for moving said segmental gear in either direction to tilt said box, a stop fixed to said box, and means carried by said first mentioned lever co-operating with said stop for limiting the tilting movement of the box.

3. In a vehicle, the combination with a frame and a tiltable load receiving box pivoted at one end thereto, of a lever having one end pivotally secured to the frame and its other end free and curved downwardly, a roller journaled in the free end of said lever and tracking along the under side of said box, a second lever having its forward end free and curved downwardly, a roller journaled in the free end of said second lever and adapted to track along the under side of said main lifting lever, a segmental gear integral with said second lever and journally carried by the frame, said levers being formed of channel iron U shaped in cross section and disposed so that one will nest within the other when said load receiving box is in its normal position, and means for rotating said segmental gear to impart a tilting movement to said load receiving box.

In testimony whereof I affix my signature.

EMIL A. BUSACKER.